United States Patent [19]

Katsuoka et al.

[11] Patent Number: 4,794,263

[45] Date of Patent: Dec. 27, 1988

[54] APPARATUS FOR MEASURING CRYSTAL DIAMETER

[75] Inventors: Nobuo Katsuoka, Takasaki; Yoshihiro Hirano; Atsushi Ozaki, both of Annaka; Masahiko Baba, Takehu, all of Japan

[73] Assignee: Shinetsu Handotai Kabushiki Kaisha, Tokyo, Japan

[21] Appl. No.: 109,722

[22] Filed: Oct. 19, 1987

[30] Foreign Application Priority Data

Oct. 29, 1986 [JP] Japan .................. 61-257674

[51] Int. Cl.$^4$ .................. C30B 15/26; G01B 11/08
[52] U.S. Cl. .................. 250/560; 250/577; 156/601; 422/249
[58] Field of Search .................. 250/560, 577; 23/301; 156/601; 422/249; 364/562, 563

[56] References Cited

U.S. PATENT DOCUMENTS

| | | | |
|---|---|---|---|
| 3,958,129 | 5/1976 | Clement et al. | 250/577 |
| 4,207,293 | 6/1980 | Scholl et al. | 156/601 |
| 4,617,173 | 10/1986 | Latka | 156/601 |
| 4,710,258 | 12/1987 | Latka | 156/601 |

Primary Examiner—Edward P. Westin
Attorney, Agent, or Firm—Browdy and Neimark

[57] ABSTRACT

An apparatus for measuring the diameter of a crystal in which an optical sensor scans along a sensing line which crosses at one point a luminous ring formed at the interface between a crystalline rod and a melt; the picture element position corresponding to a maximum luminance is discriminated when the optical sensor scans; the mean value of the picture element position is calculated over at least one revolution of the crystalline rod; and the diameter D of the crystalline rod at a portion thereof interfacing with the melt is calculated from the mean value and the level of the melt. Similarly, the minimum crystal diameter can be calculated by obtaining the picture element position corresponding to the minimum crystal diameter instead of obtaining the mean of the picture element position.

12 Claims, 4 Drawing Sheets

APPARATUS FOR MEASURING CRYSTAL DIAMETER

BACKGROUND OF THE INVENTION

1. Field of the Invention

This invention relates to an apparatus for use in a monocrystal production method in accordance with the Czochralski technique, adapted for measuring the diameter of a crystalline rod at the interface between the crystalline rod and a melt.

2. Description of he Prior Art

In a known crystal diameter measuring apparatus of this type, as shown in FIG. 4, an imaginary straight line which extends across a luminous ring 14 detected by its high luminance at the interface between a monocrystal rod 10 and a melt 12 and passes through the center of the luminous ring 14 is used as a sensing line of an image sensor, and positions of the picture elements that correspond to positions $Q_{11}$ and $Q_{12}$ on the luminous ring 14 are detected so as to obtain the distance between these positions, thereby measuring a diameter D of the monocrystal rod 10.

However, if, as shown in FIG. 5, the level of the melt 12 drops from a level $H_1$ to a level $H_2$ as the monocrystal rod 10 grows, the light emitted from a position $Q_3$ at the rear of the monocrystal rod 10 can not strike the image sensor 16, so that it becomes impossible to detect the luminous ring 14. This makes it necessary to move downward the one-dimensional image sensor 16, which consists of picture elements disposed on a straight line, or rotate it counterclockwise by a predetermined angle so that the sensing line pssses through a position $Q_{21}$ vertically below the position $Q_{11}$. Accordingly, the provision of a complicate mechanism for vertically moving or rotating the one-dimensional image sensor 16 is needed. Moreover, the operation of finely adjusting the position is not an easy task.

If, in order to avoid this problem, the crucible that contains the melt 12 is moved upward so that the level H is kept constant and the one-dimensional image sensor 16 is independently at a fixed position, the relationship between the positions of the melt 12 and the heater used for heating the melt 12 deviates from that which gives the optimum growth conditions, resulting in a reduction in the quality of the crystal.

In addition, it is necessary in order to secure the detection of the luminous ring 14 even if the monocrystal rod 10 wobbles slightly that, in practice, the positions $Q_{11}$ and $Q_{21}$ shown in FIG. 5 must be located slightly forward on the luminous ring 14 despite of a reduction in the accuracy of measurement of the diameter D.

SUMMARY OF THE INVENTION

It is therefore an object of the present invention to provide a crystal diameter measuring apparatus which is capable of measuring the diameter of a crystal very accurately, even when the level of melt fluctuates, by using a fixed optical sensor.

To this end, the present invention provides in one of its aspects an apparatus for measuring the diameter of a crystal having: an optical sensor whose sensing line crosses at one point a luminous ring formed at the interface between a crystalline rod and a melt; a peak luminance position discriminating means for determining a picture element position P that corresponds to a maximum luminance, by making the optical sensor scan; a mean peak position calculating means for calculating a mean value $\overline{P}$ of the picture element position P over at least one revolution of the crystalline rod; a level detecting means for detecting the level H of the melt; and a crystal diameter calculating means for calculating from the mean value $\overline{P}$ and the level H the diameter D of the crystalline rod at the portion thereof that interfaces with the melt, the crystal diameter calculating means outputting a signal corresponding to the diameter D.

The present invention provides in another of its aspects an apparatus for measuring the diameter of a crystal having: an optical sensor whose sensing line crosses at one point a luminous ring formed at the interface between a crystalline rod and a melt; a peak luminance position discriminating means for determining a picture element position P corresponding to a maximum luminance, by making the optical sensor scan; a minimum diameter peak position discriminating means for obtaining a picture element position Pm corresponding to a minimum crystal diameter Dm by using data on the picture element position P over at least one revolution of the crystalline rod; a level detecting means for detecting the level H of the melt; and a crystal diameter calculating means for calculating from the picture element position Pm and the level H the minimum crystal diameter Dm of the crystalline rod at the portion thereof that interfaces with the melt, the crystal diameter calculating means outputting a signal corresponding to the minimum crystal diameter Dm.

The center of the luminous ring is located at a position below and on the axis of a crystal-lifting shaft (or wire), and the position of the center of the luminous ring is fixed unless the growing crystal wobbles or vibrates. The picture element position P in the optical sensor corresponding to the maximum luminance exhibits a one-to-one correspondence with the crystal diameter D at a certain level of the melt. That is, the crystal diameter D is a function of the picture element position P and the level H, so that the crystal diameter D can be calculated from P and H.

The rate at which the optical sensor scans is much higher than the rotational speed of the crystalline rod. It is therefore possible to perform a large number of scans during one revolution of the crystalline rod. The rotational speed of the crystalline rod is much higher than the speed at which the crystalline rod is raised, so no problems occur if the mean value of the picture element position is obtaieed over a not-too-large integral number of revolutions of the crystalline rod In the first aspect of the present invention, the mean value $\overline{P}$ of the picture element position P obtained over some integral number of revolutions of the crystalline rod is used instead of the picture element position P, enabling accurate calculation of the crystal diameter D.

In the second aspect of the present invention, a signal which corresponds to the minimum crystal diameter Dm is output, and the present invention in this aspect can be applied to a crystal diameter controlling apparatus which prevents the crystal diameter from being falling below a set minimum value.

According to the present inventionin these aspects, the sensing line always crosses the luminous ring, even if the level of the melt varies. It is therefore possible to fix the optical sensor and eliminate the need for the provision of a complicated mechanism for moving the optical sensor and, hence, the need for complicated fine adjustment.

In addition, the crystal diameter is calculated by considering the level H of the melt into adjustment as well, enabling the crystal diameter to be measured very accurately even if the level varies. In that case, therefore, there is no need to keep the level constant, and it is possible to make the relationship between the positions of the melt and the heater used to heat the melt coincide with the optimum growth conditions, enabling the growth of a high-quality crystal.

DESCRIPTION OF THE PREFERRED EMBODIMENT

A preferred embodiment of the present invention will be described below with reference to the accompanying drawings.

Figure 1:
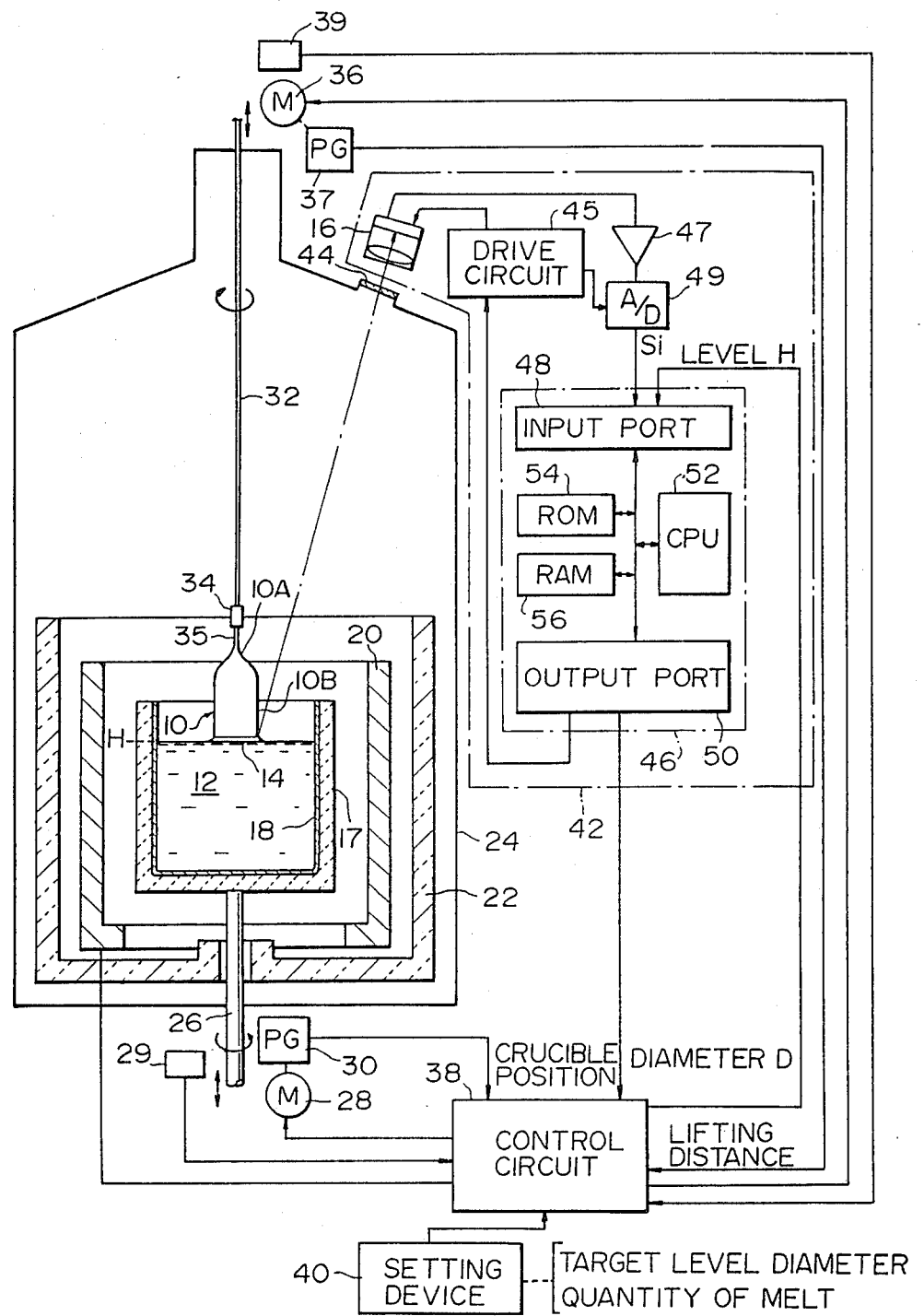
FIG. 1 is a diagram of the entire arrangement of a crystal diameter measuring apparatus which represents an embodiment of the present invention.

Referring to FIG. 1, polycrystalline silicon is contained in a quartz crucible 18 which is inserted into a graphite crucible 17. The polycrystalline silicon is superheated by a heater 20 encircling the graphite crucible 17, turning it into a melt 12. The heater 20 is encircled by a heat insulator 22. These components are disposed in a vessel 24 which is filled with argon gas.

The quartz crucible 18 is vertically moved by a motor 28 through a crucible moving shaft 26. The position of the crucible is detected by a limit switch 29 which detects a reference position, and by a pulse generator 30 which operates with the rotation of the motor 28.

A crystal-lifting shaft 32 is suspended above the melt 12, and a seed holder 34, to which a seed crystal 35 is attached, is connected to the lower end of the crystal-lifting shaft 32. The lower end of the seed crystal 35 is dipped into the melt 12 by moving the seed holder 34 downward, and the monocrystal rod 10 grows as the crystal-lifting shaft 32 is gradually raised. The crystal-lifting shaft 32 is vertically moved by a motor 36. The distance through which the monocrystal rod 10 is raised is detected by a limit switch 39, which detects a reference position, and by a pulse generator 37 which operates with the rotation of the motor 36.

The crystal-lifting shaft 32 and the crucible-moving shaft 26 coincide with the axis of rotational symmetry of the crucible 18, and the center of the luminous ring 14 formed at the interface between the monocrystal rod 10 and the melt 12 is on this axis.

The operation of controlling the level H of the melt 12 relative to a stationary point and the operation of controlling the diameter D of the monocrystal rod 10 are performed by a control circuit 38.

The target level of the melt 12 in relation to the length of the monocrystal rod 10 is set by a setting device 40 from the relationship between the positions of the heater 20 and the melt 12 in order to optimize the growth of the monocrystal rod 10. The setting device 40 also sets the shape of a cone portion 10A and the diameter of a cylindrical body portion 10B, namely, the target diameter of the monocrystal rod 10 in relation to the length thereof. The control circuit 38 drives the motors 28 and 36 and controls the supply of electric power to the heater 20 in such a manner that the level H of the melt 12 and the diameter D of the monocrystal rod 10 satisfy these set values.

Before the growth of the crystal starts, the level H is found from both the quantity of melt 12 set by the setting device 40 and the position of the crucible obtained by counting pulses supplied from the pulse generator 30. While the crystal is being grown, the level H is found by further considering the lifting distance obtained by counting pulses supplied from the pulse generator 37, and the diameter D supplied from a crystal diameter measuring apparatus 42. The quantity of melt is calculated by weighing of the polycrystalline silicon before it is melted and accordingly this weight may be input instead of the quantity of liquid and the depth of the melt 12 may be calculated by a microcomputer 46 which will be described later.

In FIG. 1, a motor for rotating the crystal-lifting shaft 32, a motor for rotating the crucible-moving shaft 26, and a sensor for sensing the temperature of the heater 20 are omitted in order to simplify the illustration. A wire may be used in place of the crystal-lifting rod 32.

The crystal diameter measuring apparatus 42 will now be described.

Figure 2:
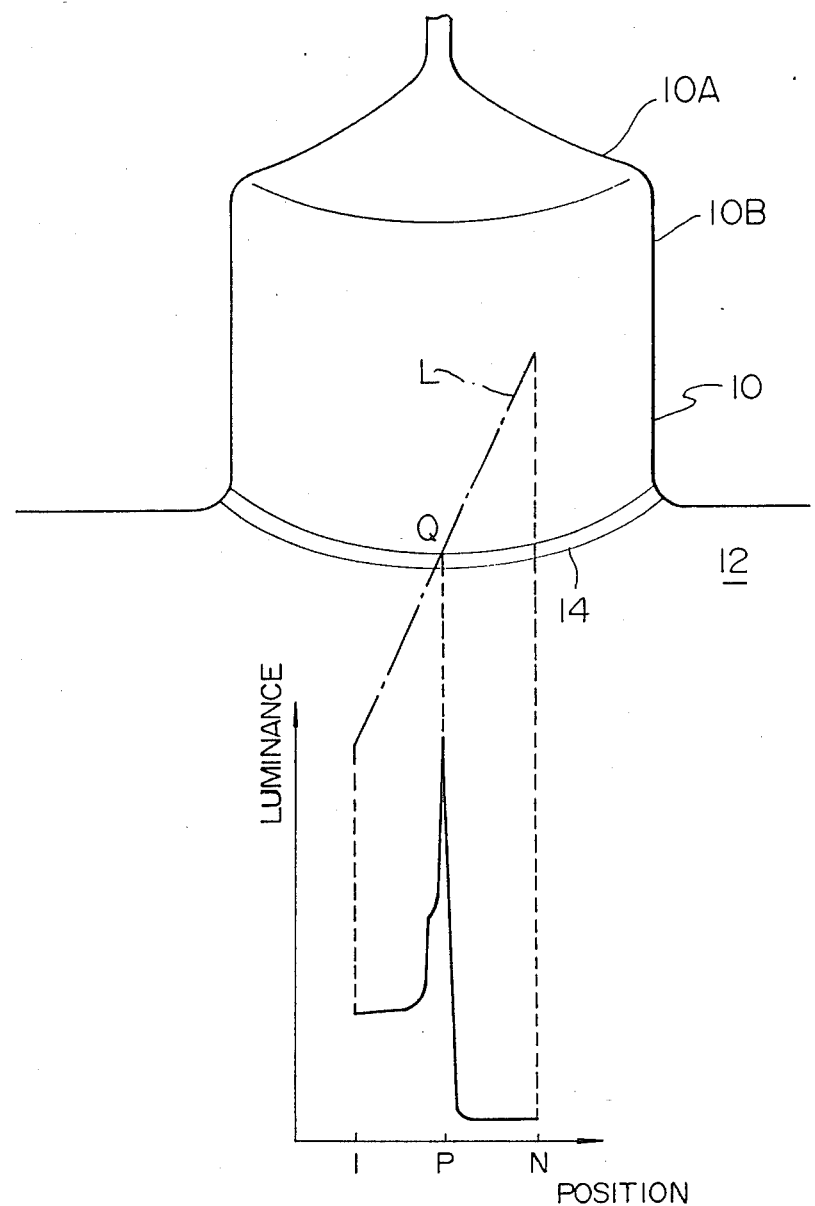
FIG. 2 is a diagram of the relationship between the sensing line and luminance.

A one-dimensional image sensor 16 with an imaging lens whose optical axis is directed toward the melt 12 is fixed at a position above a glass window 44 mounted in the vessel 24. The one-dimensional image sensor 16 is disposed on the side of the apparatus corresponding to the front of the plane of FIG. 2 in such a manner that the optical axis of the image sensor 16 is in a plane which contains the center line of the crystalline rod 10 or is in the vicinity of this plane, so that a sensing line L crosses the luminous ring 14 once at a position Q on the side nearer the one-dimensional image sensor 16. Signals which correspond to luminance along the sensing line L shown in FIG. 2 are successively output for each of picture elements from the one-dimensional image sensor 16 in response to start and clock pulses supplied from the drive circuit 45, thereby supplying luminance data Si to an input port 48 of the microcomputer 46 via an amplifier 47 and an A/D converter 49. Conversion start signals, which correspond to the clock pulses, are supplied from the drive circuit 45 to a control terminal of the A/D converter 49.

The microcomputer 46 is constituted by the input port 48, an output port 50, a CPU 52, a ROM 54, and a RAM 56 in a well-known manner. The CPU 52 supplies a scanning start signal to the drive circuit 45 through the output port 50 in accordance with a program in the ROM 54, reads the luminance data Si and the level H through the input port 48, exchanges data with the RAM 56 so as to calculate the diameter D of the monocrystal rod 10, and supplies this data to the control circuit 38 through the output port 50.

Figure 3:
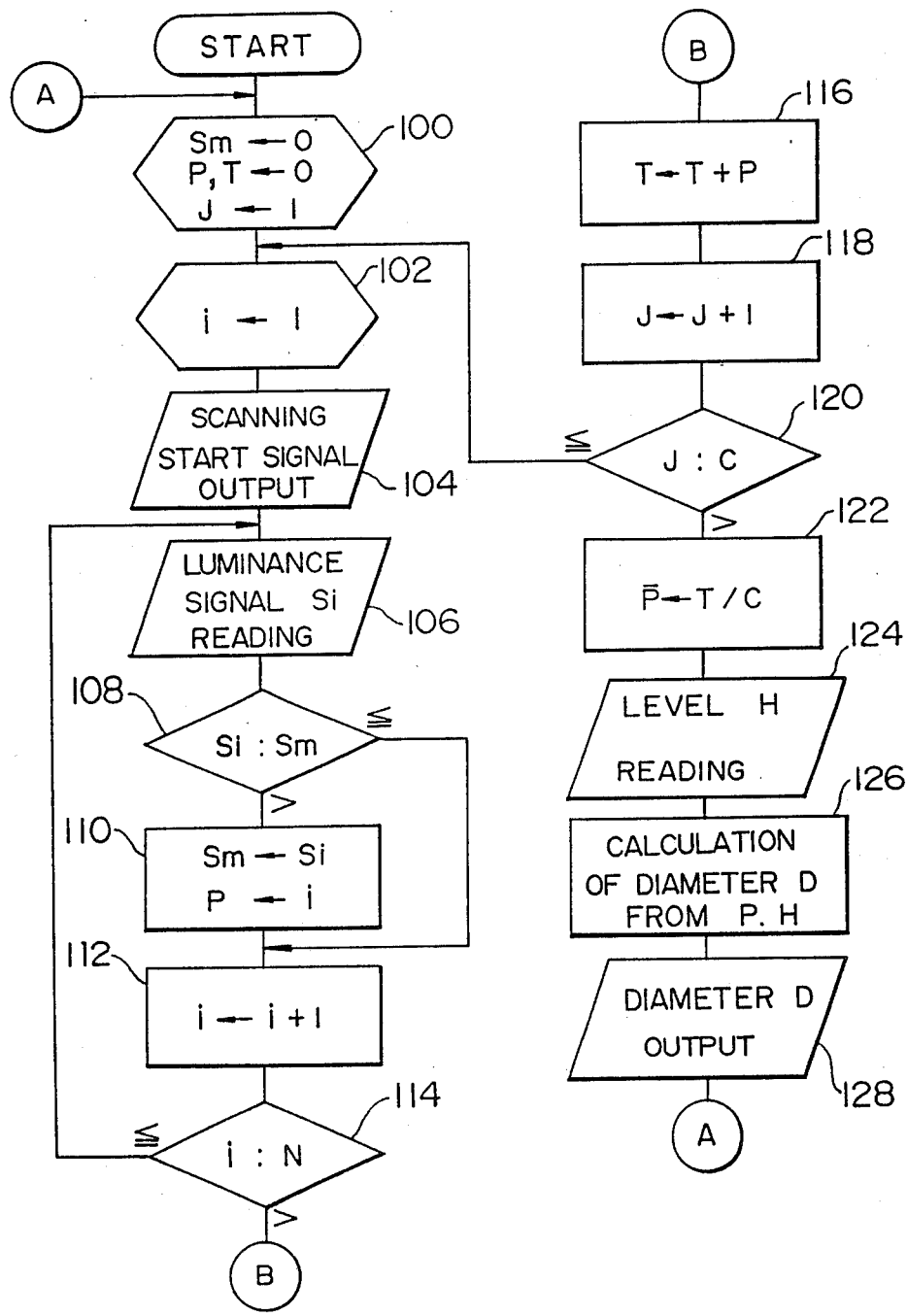
FIG. 3 is a flow chart of software in the microcomputer.
Figure 4:
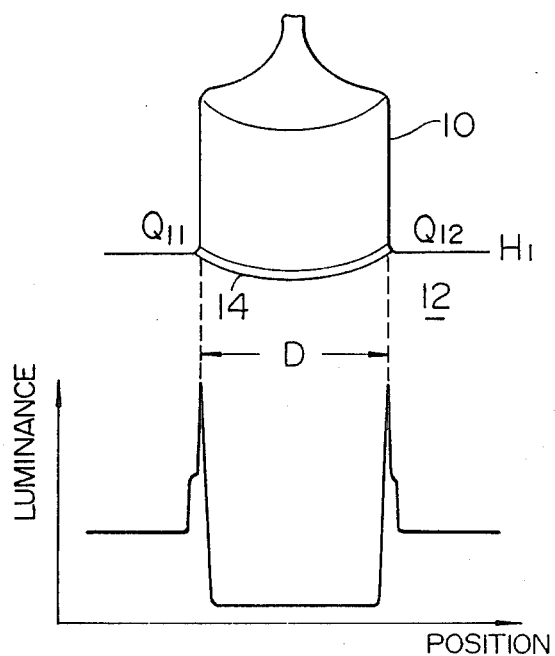
FIGS. 4 and 5 are diagrams of an example of the conventional apparatus.
Figure 5:
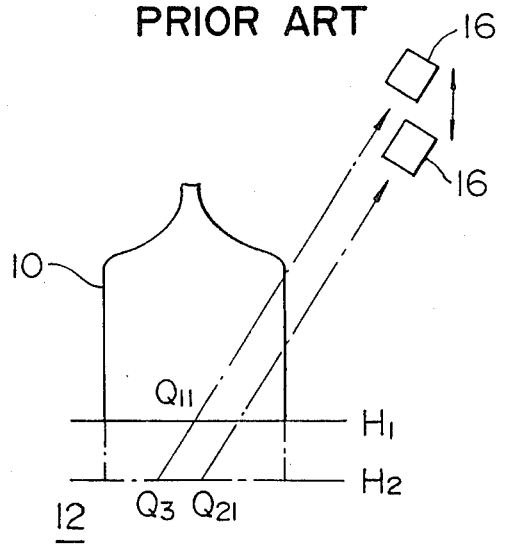

The arrangement of the software of the microcomputer 46 will now be described with reference to FIG. 3, which is a flow chart corresponding to the program in the ROM 54.

In Step 100, the maximum luminance Sm in one scan along the sensing line L, the picture element position P corresponding to the maximum luminance, and a cumulative value T at the picture element position P are set to 0, and J, wiich indicates that this is the Jth scan, is set to 1.

In Step 102, i, which indicate that this is the ith picture element, is set to 1. Next, in Step 104, a scanning start signal is output to the drive circuit 45. Start and clock signals are thereby supplied from the drive circuit 45 to the one-dimensional image sensor 16, and the luminance data Si input from the one-dimensional image sensor 16 to the input port 48 via the amplifier 47 and the A/D converter 49. In Step 106, the luminance data is read. If, in Step 108, it is determined that Si>Sm, the maximum luminance Sm is set to Si and the picture element position P of the maximum luminance is set to i in Step 110. If, after the above processing or in Step 108, it is determined that Si≦Sm, the process proceeds to Step 112, and i is incremented. If, in Step 114, it is determined that i≦N (N: the number of picture elements of the one-dimensional image sensor 16), the process returns to Step 106, and the above processing steps are repeated. The picture element position P of the maximum luminance in a scan is obtained in this manner.

In Step 116, P is added to T. Next, in Step 118, J is incremented. If, in Step 120, it is determined that J≦C, the process returns to Step 102, and the above processing steps are repeated.

C in the above inequality is the number of scans of the image sensor over M revolutions of the monocrystal rod 10. For instance, C=300 when M=2.

If it is determined that J>C, T/C is calculated in Step 122 to obtain mean value $\bar{P}$ of the picture element position P of the maximum luminance. Next, in Step 126, the diameter D of the monocrystal rod 10 is calculated by using P and H. The formula for this calculation is previously written in the ROM 54. In step 128, the diameter D is output to the control circuit 38.

The cross-sectional shape of the crystal may deviate from a round due to some crystal habit and facets. For this reason, the minimum crystal diameter Dm about the axis of crystal growth rotation may be measured instead of calculating the mean diameter so that it can be used as a controlled variable, thereby enabling wafers having a desired diameter to be formed over the entire length of the cylindrical body portion.

A crystal diameter measuring device for measuring this minimum crystal diameter can be realized by simply altering the software in the above embodiment as described below.

That is, for example, a picture element position Pm which corresponds to the minimum crystal diameter (which is located at one outmost end) is obtained from items of data on the picture element position Pm over one revolution of the crystal. Then, the mean value of the Pm is obtained over, for example, ten revolutions, and the above processing steps 124 to 128 are executed.

This process of using mean values makes it possible to obtain the minimum crystal diameter Dm with high accuracy.

In accordance with the present invention, the level detecting means may be arranged to optically detect the level of the melt 12 in such a manner that a glass window similar to the glass window 44 is mounted in an upper portion of the vessel 24; a laser generator is disposed above this window; a laser beam is emitted to the surface of the melt 12; light reflected therefrom is detected by the one-dimensional image sensor 16; and the level of the melt is calculated from the picture element position corresponding to the striking spot of this light. Otherwise, the arrangement is such that the position of the interface between the surface of the melt and the quartz crucible 18 is detected by the one-dimensional image sensor 16; and the level is calculated by a microcomputer.

A one-dimensional optical sensor is preferred to be used as the optical sensor in accordance with the present invention. However, it suffices to dispose the sensor in such a manner that the sensing line crosses at one point of the luminous ring formed at the interface between the crystal and the melt. Examples of other arrangements of the sensor are one in which a radiation thermometer adapted to detect the spot temperature is rotated and its rotational positions are detected in correspondence with the picture element positions, and one in which a specific scanning line is used by a two-dimensional image sensor or an industrial TV camera.

The embodiment of the present invention has been described with respect to the case in which the level of the melt 12 changes. However, the present invention is not limited to this, and is also aplicable to a crystal diameter control apparatus which controls the crystal forming system to constantly maintain the level of the melt.

What is claimed is:

1. An apparatus for measuring the diameter of a crystal comprising:
    an optical sensor whose sensing line crosses at one point a luminous ring formed at the interface between a crystalline rod and a melt;
    peak luminance position discriminating means for determining a picture element position P corresponding to a maximum luminance, by making said optical sensor scan;
    mean peak luminance position calculating means for calculating a mean value $\bar{P}$ of said picture element position P over at least one revolution of said crystalline rod;
    level detecting means for detecting the level H of said melt; and
    crystal diameter calculating means for calculating from said mean value $\bar{P}$ and said level H the diameter D of said crystalline rod at the portion thereof interfacing with said melt, said crystal diameter calculating means outputting a signal corresponding to said diameter D.

2. An apparatus according to claim 1, wherein the optical axis of said optical sensor is in a plane which contains the center axis of said crystalline rod or in the vicinity of said plane.

3. An apparatus according to claim 2, wherein said optical sensor is an one-dimensional image sensor.

4. An apparatus according to claim 2, wherein said optical sensor is a two-dimensional image sensor which makes use of a specific scanning line.

5. An apparatus according to claim 3, wherein said mean peak position calculating means calculates a mean value $\bar{P}$ of said picture element position P over an integral number of revolutions.

6. An apparatus according to claim 3, wherein said level detecting means has: means for detecting the initial position of the surface of said melt; means for detecting the distance through which a crucible which contains said melt is lifted; means for detecting the weight of a raise part of said crystalline rod; and means for calculating the level of said melt from said initial position, said distance and said weight.

7. An apparatus for measuring the diameter of a crystal comprising:

an optical sensor whose sensing line crosses at one point a luminous ring formed at the interface between a crystalline rod and a melt;

peak luminance position discriminating means for determining a picture element position P corresponding to a maximum luminance by making said optical sensor scan;

minimum diameter peak position discriminating means for obtaining a picture element position Pm corresponding to a minimum crystal diameter Dm by using data on said picture element position P over at least one revolution of said crystalline rod;

level detecting means for detecting the level H of said melt; and crystal diameter calculating means for calculating from said picture element position Pm and said level H said minimum crystal diameter Dm of said crystalline rod at a portion thereof interfacing with said melt, said crystal diameter calculating means outputting a signal corresponding to said minimum crystal diameter Dm.

8. An apparatus according to claim 7, wherein the optical axis of said optical sensor is in a plane which contains the center axis of said crystalline rod or in the vicinity of said plane.

9. An apparatus according to laim 8, wherein said optical sensor is an one-dimensional image sensor.

10. An apparatus according to claim 8, wherein said optical sensor is a two-dimensional image snnsor which makes use of a specific scanning line.

11. An apparatus according to claim 9, wherein said minimum diameter peak position calculating means calculates said picture element position Pm corresponding to said minimum crystal diameter Dm by using data on said picture element position P over an integral number of revolutions.

12. An apparatus according to claim 9, wherein said level detecting means has: means for detecting the initial position of the surface of said melt; means for detecting the distance through which a crucible which contains said melt is lifted; means for detecting the weight of a raised part of said crystalline rod; and means for calculating the level of said melt from said initial position, said distance and said weight.

* * * * *